(12) United States Patent
Pierrat

(10) Patent No.: US 7,010,764 B2
(45) Date of Patent: Mar. 7, 2006

(54) EFFECTIVE PROXIMITY EFFECT CORRECTION METHODOLOGY

(75) Inventor: Christophe Pierrat, Santa Clara, CA (US)

(73) Assignee: Takumi Technology Corp., Sunnyvale, CA (US)

( * ) Notice: Subject to any disclaimer, the term of this patent is extended or adjusted under 35 U.S.C. 154(b) by 302 days.

(21) Appl. No.: 10/413,052

(22) Filed: Apr. 14, 2003

(65) Prior Publication Data

US 2004/0205688 A1    Oct. 14, 2004

(51) Int. Cl.
G06F 17/50 (2006.01)
G03F 1/00 (2006.01)
G03C 5/00 (2006.01)

(52) U.S. Cl. .............................. 716/4; 716/19; 716/21; 430/4; 430/5; 430/30

(58) Field of Classification Search .................... 716/1, 716/2, 4, 19–21; 382/144; 430/4, 5, 30
See application file for complete search history.

(56) References Cited

U.S. PATENT DOCUMENTS

| | | | | |
|---|---|---|---|---|
| 5,723,233 A * | 3/1998 | Garza et al. | ..................... | 430/5 |
| 6,269,472 B1 * | 7/2001 | Garza et al. | ..................... | 716/21 |
| 6,553,559 B1 * | 4/2003 | Liebmann et al. | ............. | 716/19 |
| 6,829,380 B1 * | 12/2004 | Choo et al. | .................. | 382/144 |
| 2004/0170905 A1 * | 9/2004 | Liebmann et al. | ............. | 430/5 |

OTHER PUBLICATIONS

Torres, J.A., et al., "Contrast-Based Assist Feature Optimization," Deep Submicron Technical Publication, May 2002, Mentor Graphics, 8 pages.

Brunner Timothy A., et al., "Optical/Laser Microlithography VIII," SPIE, vol. 2440, 301-312.

Garofalo, J., et al., "Automatic Proximity Correction for 0.35Fm I-Line Photolithography," IEEE, Numerical Modeling of Processes and Devices for Integrated Circuits, 1994. NUPAD V., International Workshop on Jun. 5-6, 1994, 92-94.

Rieger, Michael L., et al., "Using Behavior Modelling for Proximity Correction," SPIE, 1994, 6 pages.

Stirniman, John P., et al., "Fast Proximity Correction with Zone Sampling," SPIE, vol. 2197, 294-390.

Stirniman, John P., et al., "Optimizing Proximity Correction for Wafer Fabrication Processes," SPIE, vol. 2322, Photomask Technology and Management (1994) 239-246.

Liebmann, L.W. et al., "TCAD development for lithography resolution enhancement," IBM J. Res. & Dev. vol. 45, No. 5, Sep. 2001, 651-665.

* cited by examiner

Primary Examiner—Leigh M. Garbowski
(74) Attorney, Agent, or Firm—Russo & Hale LLP; William C. Milks, III

(57) ABSTRACT

Proximity effect correction has become a necessary step in the fabrication of integrated circuit in order to improve the pattern fidelity of current lithography processes. Current methodology is limited by data volume increase and correction inaccuracy due to extrapolation of the correction. The invention describes a methodology based on the interpolation of the correction between selected evaluation points of the target layout. By connecting the correction points this technique also provides a mean of reducing data volume and simplifying the mask writing, inspection and repair processes. The same methodology can be applied to layouts with non-printing assist features, where the correction of the assist features is based on the quality of the image of the main feature. For vector-scan mask write tool the segments interpolating the corrections can be fractured in segments with suitable angles.

28 Claims, 6 Drawing Sheets

EFFECTIVE PROXIMITY EFFECT CORRECTION METHODOLOGY

FIELD OF THE INVENTION

The invention relates to the process of fabricating semiconductor chips. More specifically, the invention relates to a method for performing proximity effect correction.

RELATED ART

Integrated circuit technology improvements are mostly driven by the decrease of the feature size of the semiconductor chips. As the feature size of the circuit decreases, circuit designers have to deal with the limitations of the lithography process used to manufacture the integrated circuits. The lithography process starts first by coating the surface of the semiconductor wafer with a material called resist. A source of radiation is then shone through a mask placed over the resist layer in the case of a transparent mask. For a reflective mask the radiation is reflected by a mask placed over the resist layer. The transparent mask is made of a substrate transparent to the radiation and coated with a patterned opaque layer defining clear and opaque regions to the radiation. Transparent masks are mostly used in optical lithography with typical wavelengths of 436 nm, 405 nm, 365 nm, 248 nm, 193 nm, and 157 nm. The reflective masks are made using a substrate reflective to the radiation and coated with a patterned non-reflective layer defining reflective and non-reflective regions to the radiation. Alternatively, a reflective mask could be made of a non-reflective substrate coated with a reflective layer. Reflective masks are mostly used for shorter radiation wavelength on the order of 13 nm usually referred to as EUV or Extreme Ultra Violet. During the exposure to the radiation source, an image of the mask is formed using a system on top of the resist layer. The resist layer is exposed by the radiation passing through the mask in case of transmission mask or reflected by the mask in the case of a reflective mask. The resist is then developed in a developer bath and depending on the polarity of the resist (positive or negative), the exposed regions or the unexposed regions of the resist are removed. The end result is a semiconductor wafer with a resist layer having a desired pattern. This resist pattern can then be used by subsequent processing steps of the underlying regions of the wafer.

As the feature size decreases, distortion in the pattern transfer process becomes more severe. The design shapes must be modified in order to print the desired images on the wafer. The modifications account for the limitation in the lithography process. One such modification is referred to as Optical Proximity Correction (OPC) in the case of optical lithography. In the case of OPC, modifications of the design image account for optical limitations as well as mask fabrication limitations and resist limitations. Modifications of the design image can also account for the subsequent process steps like dry etching or implantation. It can also account for flare in the optical system as well as pattern density variations. Another application of proximity effect correction is the correction of aberrations of the optical system used to print the image of the mask onto the wafers. In this case, a mask with aberration correction would be dedicated to a given lithography tool as the aberrations are tool specific.

The limitation of current optical systems is driven by the following equation:

$$R = k_1 \lambda / NA$$

R=resolution
λ=wavelength of the illumination source
NA=numerical aperture of the exposure system The maximum resolution (or smallest line in a pattern made of equal lines and spaces) achieved for standard optical system is achieved for $k_1=0.25$. But for value of $k_1$ below 0.5, severe distortion of the pattern can be observed on the wafer thus requiring the correction of the mask in order to print the desired image on the wafer.

FIG. 1 illustrates the modification of the mask data to correct proximity effects. The processing of the mask data starts with a target layout 101 representing the desired dimensions of the image on the wafer. The printed image 102 of the target layout 101 differs from the desired image due to proximity effect. For reference, the target image 101 is shown with the printed image 102. The edges of the features are then moved (103) so that the corresponding printed image on the wafer 104 is correct (as close to the target as possible). In FIG. 1, all the areas of the layout have been corrected but proximity effect correction can be limited to areas that really matter like for example gate regions in poly level.

The corrections to layout 101 can be applied using a rule-based approach or a model-based approach. For a rule-based approach (Rule-based OPC), the displacement of the segments would be set by a list of rules depending, for example, on the feature size and its environment. For a model-based approach (Model-based OPC), the printed image on the wafer would be simulated using a model of the pattern transfer process. The correction would be set such that the simulated image matches the desired wafer image. A combination of rule-based OPC and model-based OPC sometimes referred to as hybrid OPC can also be used.

In the case of model-based OPC, the original layout 201 as shown in FIG. 2 is dissected in smaller segments 203 shown in modified layout 202. Each segment is associated an evaluation point 204. The printed errors of the evaluation points are compensated by moving the corresponding segment in a direction perpendicular to the segment as shown in the final layout 205. The segments are corrected using multiple iterations in order to account for corrections in the proximity of each individual segment.

One of the main issues with the current model-based and rule-based OPC methodologies is that the number of vertices is considerably increased after correction thus leading to much larger data volume after correction compared to before correction (typically an order of magnitude larger). Larger data volume increases the processing time of the data as well as the time it takes to write the mask. Moreover the complexity of the correction can create some issue for vector-scan e-beam mask writing tool as very small slivers are created when the data is converted to the mask write tool format. These small slivers lead to exposure dose inaccuracies when the mask is exposed which in turn result in dimension inaccuracies.

Another issue with model-based OPC is that the correction is accurate for the evaluation points but there is no guarantee that the correction will be adequate for a point in-between the evaluation points since discontinuities in the correction are introduced by the dissection points. The correction applied to a point in-between the evaluation points is based on extrapolation which is inherently prone to errors. This effect is described in FIG. 3. Two segments 301 and 302 are corrected using model-based OPC. The resulting printed image 303 and the target layout 304 are also shown. For the evaluation points 305 and 306, the printed image 303 matches closely the target layout 304. For a point 307 in-between the evaluation points 305 and 306, the printed image is not matching the target image.

FIG. 4 describes another limitation of the current OPC methodology. The correction of a layout composed of two opposite corners (401) results in a layout 402 where a tight space 403 has been created between the corners. This tight space is undesirable as it will result in reduced process latitude when the wafer is exposed. The tight space could also be difficult to manufacture on the mask and also create subsequent inspection and repair issue.

The limitation exhibited in FIGS. 3 and 4 is resulting from the extrapolation of the correction in between the evaluation points which is inherently inaccurate. A trade-off is made between increasing the number of evaluation point to increase the accuracy of the correction and decreasing the number of evaluation point in order to speed up the correction.

What is needed is a new OPC methodology that will reduce the data volume expansion after OPC, prevent the creation of slivers during data fracturing, create more accurate corrections in-between the evaluation points and avoid the creating of small spaces between opposite corners.

SUMMARY

A method for performing proximity effect correction on a layout of an integrated circuit is described. The method provides a simplified correction methodology that will produce layouts with more accurate corrections and will also reduce the data volume expansion after proximity effect correction.

For a given layout, evaluation points corresponding to locations of the layout where the correction should meet a given specification can be identified. A data processor is subsequently used to perform a proximity effect correction of the evaluation points thus creating correction points. The corrected layout is created by interconnecting adjacent correction points.

In some embodiments, the correction points are created by translating the evaluation points. The translation can be performed along a line perpendicular to the original layout.

In some embodiments, the interconnecting curve can be a straight line, a polynomial function, or it can be fractured into a set of lines arranged on a limited set of angles.

In some embodiments, evaluation points are placed on sub-resolution assist features. In this case, the proximity effect correction can be performed by calculating the position of the correction points in order to enhance the contrast of an aerial image of the pattern to be assisted by the corresponding sub-resolution assist feature.

Another method for performing proximity effect correction on a layout of an integrated circuit is also described. The method provides a correction methodology that will produce layouts with more accurate corrections.

The segments defining a given layout are dissected in smaller segments. A data processor is subsequently used to perform a proximity effect correction of the segments where the corrected segments can be non parallel to the corresponding input segments.

In some embodiments, at least one evaluation point per segment is identified and the segments are corrected by rotating and translating the input segments relative to their respective evaluation points.

In some embodiments, the ends of adjacent corrected segments are connected using an interconnecting segment. Each segment can also be extrapolated and connected to adjacent segments using a vertex created at the intersection with the adjacent segments. The extrapolation of the corrected segments can be performed along a straight line or along a curve defined for example using a third order polynomial. In a subsequent step, the corrected segments can be fractured into a set of lines arranged on a limited set of angles in order to facilitate the mask fabrication process for vector scan mask write tools.

In some embodiments, at least one evaluation point is identified within the input segment and the position of the corrected segment is obtained by computing a translation relative to the evaluation point.

In some embodiments, some input segments can be placed on sub-resolution assist features. In this case, the proximity effect correction can be performed by calculating the position of the corrected segment in order to enhance the contrast of an aerial image of the pattern to be assisted by the corresponding sub-resolution assist feature.

Embodiments of the invention include a photolithographic mask. The photolithographic mask comprises a layout pattern that has been corrected for proximity effects using one of the methods described above.

Embodiments of the invention include a method for manufacturing integrated circuits. The method includes exposing a layer of material in an IC using a mask defined above.

Embodiments of the invention include a method for producing a photolithographic mask. The photolithographic mask is fabricated using a mask layout. The mask layout includes a layout pattern that has been corrected for proximity effects using one of the methods described above.

Embodiments of the invention include a system for producing a layout. The system includes a data processor which executes programs of instruction and a memory accessible by the data processor to store programs of instruction. The programs of instruction include logic to receive the computer readable layout of a portion of the integrated circuit and to correct the layout using one of the correction methods described above.

Embodiments of the invention include an article of manufacture, comprising a machine readable data storage medium storing programs of instruction. The programs of instruction include logic to receive a computer readable layout of a portion of the integrated circuit and to correct the layout using one of the correction methods described above.

DETAILED DESCRIPTION

Figure 1:
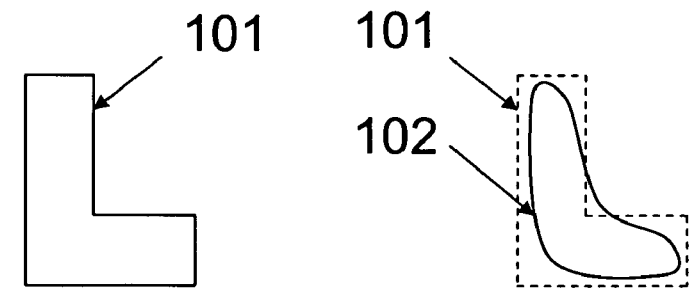
FIG. 1 illustrates the modification of the data to correct proximity effects.
Figure 1:
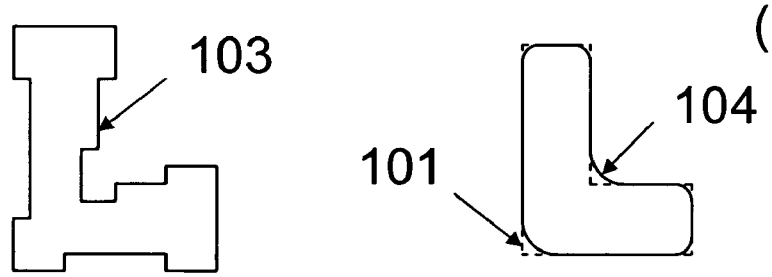
Figure 2:
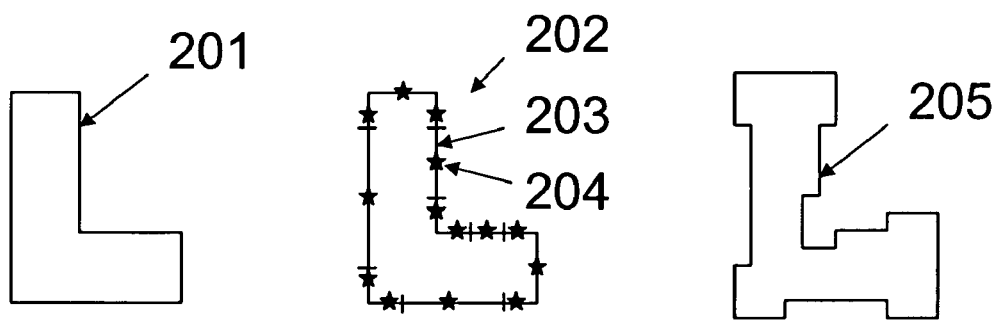
FIG. 2 illustrates the process flow used for model-based OPC.
Figure 3:
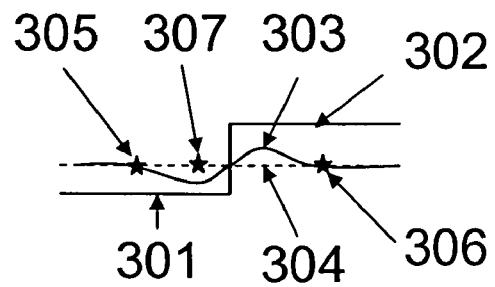
FIG. 3 illustrates OPC correction inaccuracies for a point in-between the evaluation points.
Figure 5:
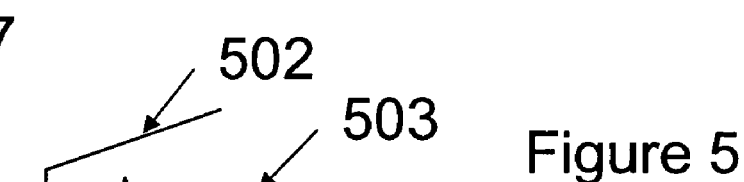
FIG. 5 illustrates a correction of the distance and angle of the segments.

FIG. 5 illustrates how a better extrapolation of the correction can be achieved by changing the angle of the segments. The target layout and original placement of the segments is represented by the line 504. 501 and 502 represent the position of the segments after correction. It should be noted that the segments have been shifted as well as rotated from their original position along line 504. The evaluation points for the segments 501 and 502 are respectively 505 and 506. Line 503 indicates the position of the image on the wafer when the corrected data is used. Compared to FIG. 3 (same target as FIG. 3), a better correction was achieved thanks to the rotation of the segments for a point 507 in-between the evaluation points 505 and 506.

Figure 6:
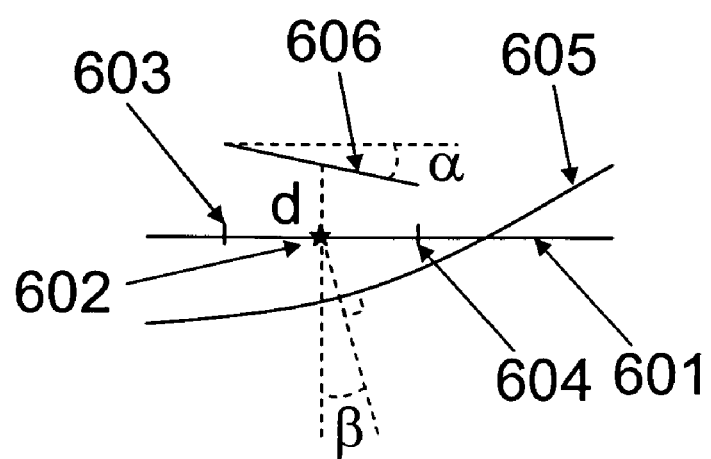
FIG. 6 illustrates a method for calculating the shift and rotation of the segments.
Figure 7:
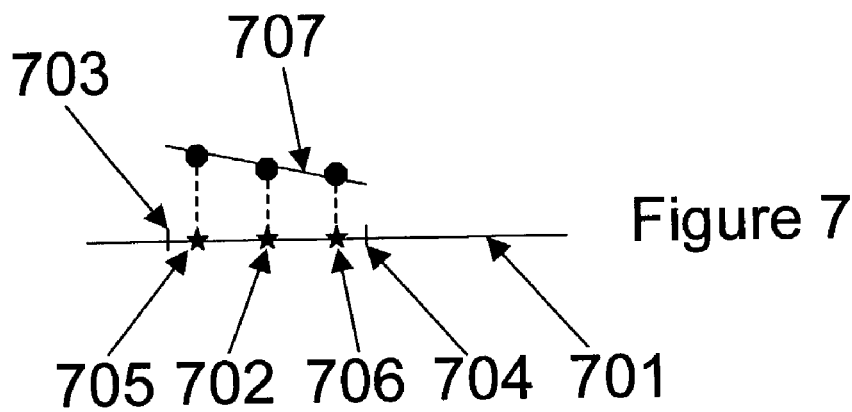
FIG. 7 illustrates a method for calculating the position of the segments after correction by averaging the position of multiple evaluation points.

FIG. 6 illustrates one method used to calculate the shift and rotation of the segments. Line 601 represents the original layout as well as the target wafer image. An evaluation point 602 is placed on line 601 with two dissection points 603 and 604. The wafer image before correction is represented by line 605. The segment placement after correction is represented by 606. The segment after correction is characterized by its distance from the original layout d and by its angle from the original layout angle α. It should be noted that instead of d, a distance d'=d. cos α could be used. d' represents the distance from the original evaluation point location to the corrected segment along a path perpendicular to the corrected segment. Two different methods can be used to calculate the distance d and the angle α. First, multiple evaluation points can be used. The correction required by each evaluation point is then calculated and then fitted as shown in FIG. 7. Line 701 represents the original layout as well as the target wafer image. An evaluation point 702 is placed on line 701 with two dissection points 703 and 704. Two additional evaluation points 705 and 706 have been placed on each side of the evaluation point 702. The segment 707 represents the position of the original segment after correction. The position of the segment has been calculated by fitting the position of the three evaluation points after correction (shown in black dots on FIG. 7). The fitting function used in the example of FIG. 7 is a first order polynomial. To achieve better fitting, higher order polynomial could be used such as second or third order polynomials. Another method consists in calculating the angle β shown in FIG. 6 and setting up α to be equal to β, a fraction of β, or a function of β.

Figure 8:
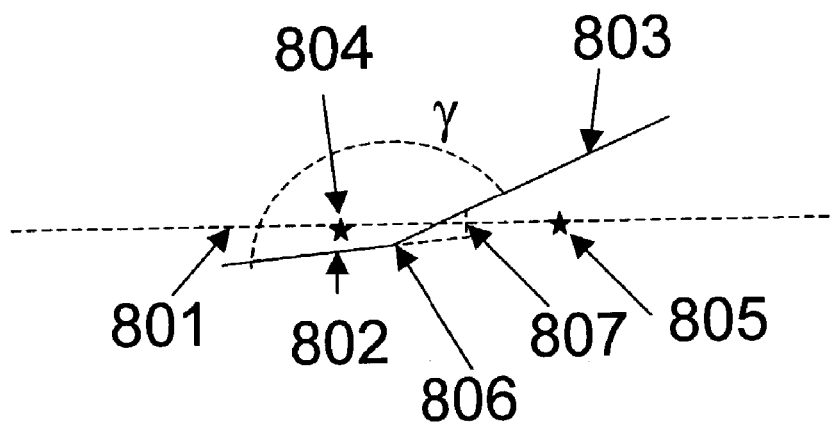
FIG. 8 illustrates how the data volume can be reduced by extrapolating the segments and using the intersection between adjacent segments as new vertices.

FIG. 8 shows how the data volume issue can be addressed. Line 801 represents the position of the original layout as well as the target wafer image. The corrected segments 802 and 803 with respective evaluation points 804 and 805 have been extrapolated so that one vertex 806 is created at the intersection of the two segments. The original dissection point 807 is indicated for reference in FIG. 8. This technique potentially saves one vertex at the intersection of two segments compared to the technique used in FIG. 5. This saving can only be accomplished if we allow the rotation of the segments. If the angle γ between the two segments is too close to π radian (180 degrees), the technique described in FIG. 5 would be used to connect the segments.

Figure 9:
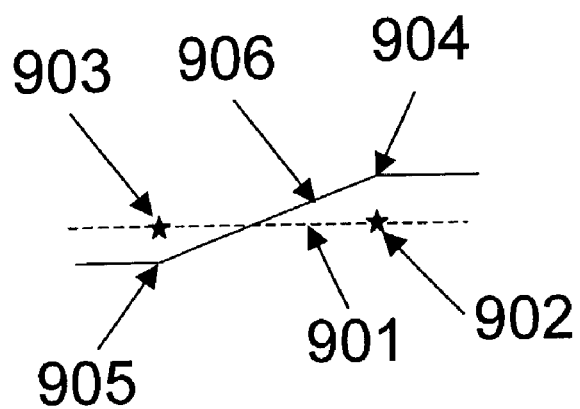
FIG. 9 illustrates a technique where the evaluation points are used as vertices of the corrected layout.

To further simplify the technique described in FIGS. 5 and 8, the dissection points can be used as vertices of the corrected layout as shown in FIG. 9. Line 901 represents the position of the original layout as well as the target wafer image. The evaluation points 902 and 903 create the respective correction points 904 and 905. By connecting the correction points 904 and 905 with line 906, the correction of the points located in-between the evaluation points 902 and 903 is interpolated. This interpolation technique is more accurate that the technique described in prior art. The fitting function used in the example of FIG. 9 is a first order polynomial. To achieve better fitting, higher order polynomial could be used such as second or third order polynomials. The evaluation points 902 and 903 are preferably chosen in critical locations of the layout in order to ensure that the correction is accurately applied to the most critical locations of the layout. The correction points 904 and 905 can be generated using a rule-based or a model-based methodology.

Figure 4:
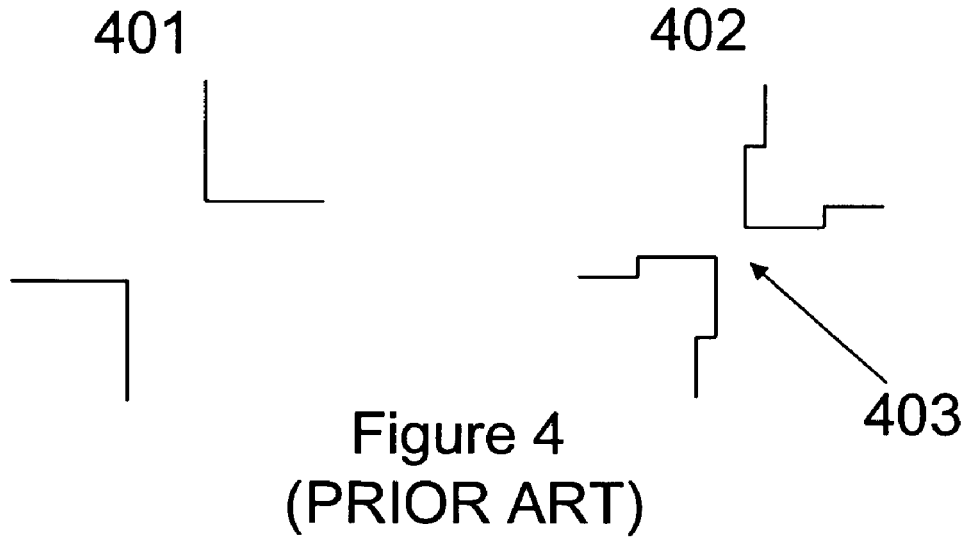
FIG. 4 illustrates the creation of small spaces between opposite angle corners after OPC.
Figure 10:
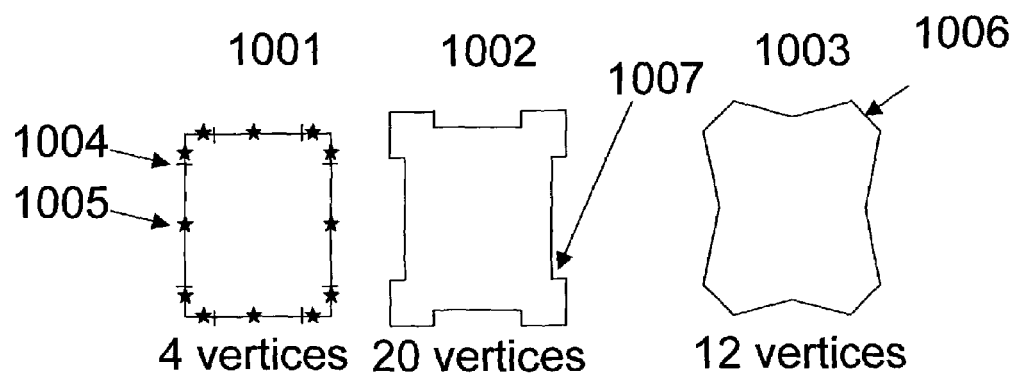
FIG. 10 illustrates the reduction in number of vertices for the technique described in FIG. 9 compared to the prior art.

FIG. 10 shows a comparison in number of vertices between a layout before correction 1001, the layout after correction described in prior art 1002, and the layout 1003 after correction using the correction methodology described in FIG. 9. For reference dissection point 1004 and evaluation point 1005 are shown on FIG. 10. Before correction, the number of vertices is four. Using the prior art proximity correction methodology, the number of vertices is increased to twenty. Using the technique described in FIG. 9, the number of vertices is only twelve which shows a significant reduction compared to the prior art. The technique also presents the advantage of creating smoother corners like 1006 which in turn will prevent the problem described in FIG. 4. The smoother corners as well as the absence of small jogs like 1007 will also facilitate the mask inspection and repair process.

Figure 11:
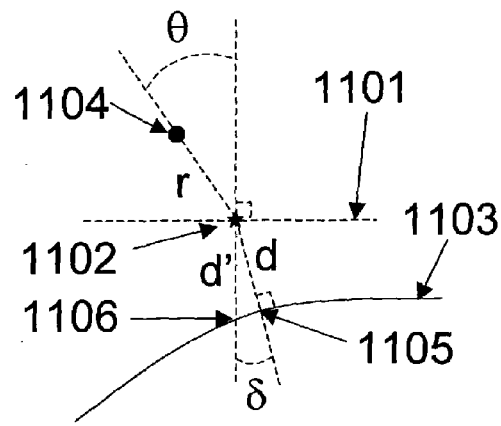
FIG. 11 illustrates a more general correction methodology.

The correction of the evaluation point is described in a more general fashion in FIG. 11. Line 1101 represents the position of the original layout as well as the target wafer image. An evaluation point 1102 is shown on the original layout. Line 1103 represents the printed image on the wafer. To correct for the difference between the printed image on the wafer 1103 and the target wafer image 1101, a new vertex corresponding to correction point 1104 is created in the layout. The position of 1104 with respect to the evaluation point 1102 is given by r and θ where r is the distance from 1102 to 1104 and θ is the angle between a line perpendicular to the original layout passing by 1102 and a line perpendicular to the printed image on the wafer passing by 1102. d is the distance from 1102 and 1105, d' is the distance from 1102 and 1106, δ is the angle between a line perpendicular to the original layout passing by 1102 and a line passing by 1102 and 1104.

In the most general case, r and θ are functions of d and δ. For model-based OPC, θ could be equal to a fraction of δ at each iteration (for example 80%). For rule-based OPC, θ could be chosen from a rule table generated before correction from the printing of test structures. For simplification, θ can be made equal to δ.

For model-based OPC, r is a fraction of d at each iteration (for example 80%) in order to ensure that the correction of all the segments converges. For rule-based OPC, r is chosen from a rule table.

In the simple case described in FIG. 9, θ=0 and r is a function of d'. Typically, for model-based OPC r is a fraction of d' at each iteration. For rule-based OPC, r is chosen from a rule table.

Figure 12:
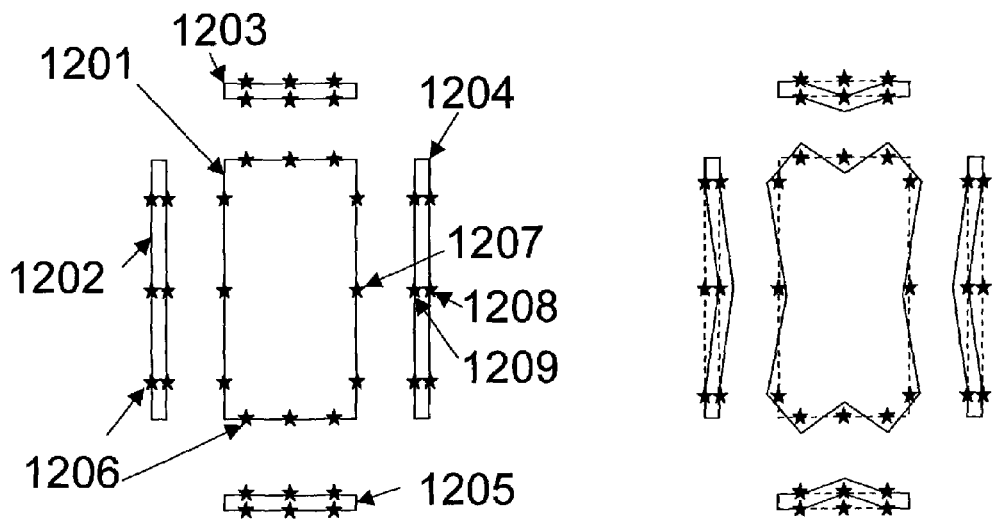
FIG. 12 illustrates a correction methodology for layouts with non-printing assist features.

The correction methodology described in FIG. 9 can be applied to a layout with non-printing assist features as described in FIG. 12. The layout on the left represents the original layout composed of a main feature 1201 and of assist features 1202, 1203, 1204, and 1205. Evaluation points have been placed on the layout (like for example 1206) and are represented by stars. Evaluation points are placed on the main feature and on the assist features. Preferably but not necessarily, the evaluation points of the main feature are projected on the assist feature to create evaluation points on both sides of the assist features. For example, evaluation point 1207 on the main features was projected on the adjacent assist feature 1204 to create two evaluation points 1208 and 1209 on the assist feature. The main feature 1201 should be printed on the wafer while the assist-features 1202, 1203, 1204, 1205, should not be printed. The assist features improve the printability of the main feature as measured for example by its process latitude or by the contrast of the aerial image on the wafer. The process latitude could be defined by the dose and focus latitude of the resist edge placement.

The layout on the right side of FIG. 12 represents the layout after proximity effect correction. The main feature has been corrected in a similar fashion as the feature 1003 of FIG. 10. The assist features have also been corrected. Preferably the correction of the assist feature is based on the contrast on the aerial image at the corresponding evaluation point on the main feature. For example, the correction of the evaluation points 1208 and 1209 is based on the contrast of the aerial image at the evaluation point 1207. Other criteria could be used like for example the dose or focus latitude of the aerial image at the location of the evaluation point 1207. When the points 1208 and 1209 are corrected, additional requirements must be met. The distance between the main feature and the assist feature cannot be made too small as it could be difficult to resolve on the mask. The width of the assist feature cannot be made too small as it would be difficult to manufacture on the mask or made too large as it might print on the wafer. These criteria depend on the mask fabrication process and on the wafer exposure conditions.

In a preferred embodiment, the evaluation points on the assist feature are corrected first in order to improve the process latitude of the main feature. Then, the evaluation points on the main feature are corrected in order to adjust the size of the printed image of the main feature. For model-based proximity correction this procedure would be repeated for each iteration.

Figure 13:
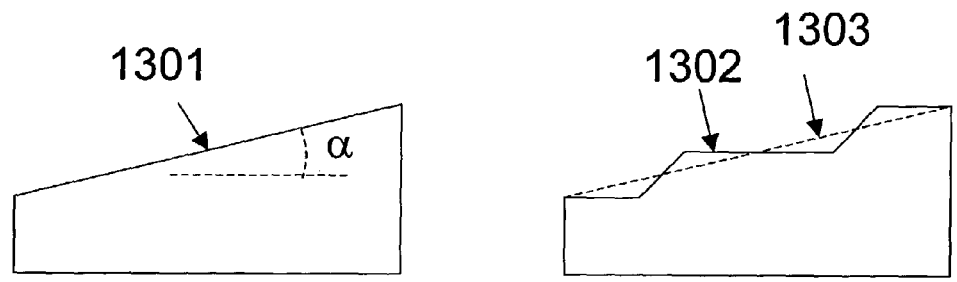
FIG. 13 illustrates the dissection of edges to comply with the limitations of vector-scan mask write tools.

Data fracturing for mask writing:

Two main writing strategies are used today for mask manufacturing. For the first strategy named "raster-scan", an electron or optical beam is scanned on the mask and turned it on where the mask should be exposed. For the second strategy named "vector-scan", a shaped e-beam is exposed at certain coordinates on the mask representing the data where the mask should be exposed. The shaped beam exposure tools usually require the data to only contain a certain set of angles. Typically these angles are 45 degree, 90 degree and 135 degree angles because of the restriction of the shapes that can be produced by the exposure tool. If the data contains other angles, the data will be modified to only contain 45 degree, 90 degree and 135 degree angles. FIG. 13 depicts such a case. Polygon 1301 contains an angle α different from 45 degree, 90 degree or 135 degree. Polygon 1302 represents the data after modification. The segment at an angle α has been dissected in smaller segments. The original segment 1303 is shown in dotted line. Although FIG. 13 describes the fracturing of the edge for a certain set of angles, namely 45 degree, 90 degree and 135 degree angles, another set of angle corresponding to another vector-scan writing tool could be chosen. This data manipulation increases the data volume only at the last stage of the data manipulation, right before the mask is made thus minimizing the impact of the data volume on the overall data processing flow.

Figure 14:
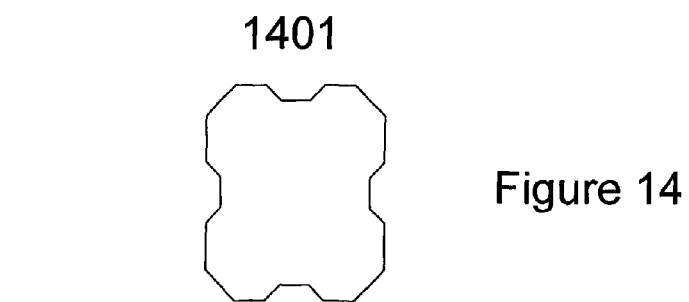
FIG. 14 illustrates the modification of the layout 1003 FIG. 10 to comply with the limitations of vector-scan mask write tools.
Figure 15:
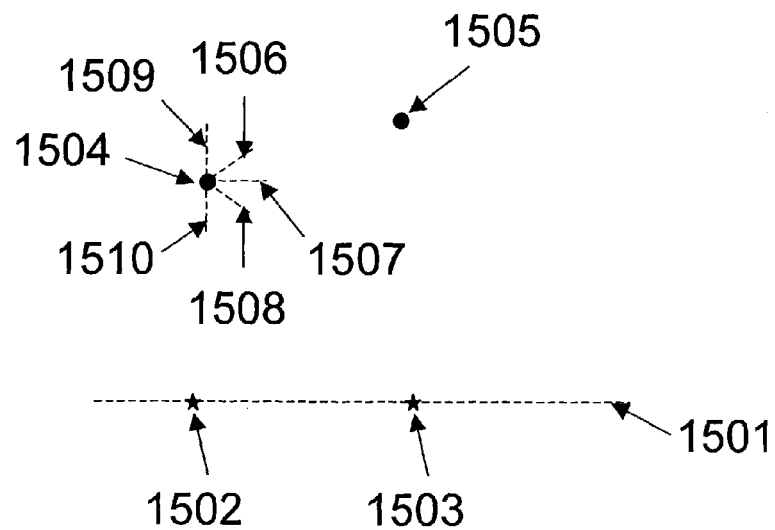
FIG. 15 illustrates the preferred angles for segments used to connect two correction points in order to comply with the limitation of "vector-scan" mask write tools.

To accommodate the limitation of vector-scan e-beam write tools, the data shown in FIG. 10, 1003 can be modified as described in FIG. 14. In a preferred embodiment, the segments would be dissected according to the rule described in FIG. 15. Line 1501 represents the original layout with the evaluation points 1502 and 1503 and corresponding correction vertices 1504 and 1505. To connect 1504 and 1505, the preferred segment directions from correction point 1504 are given by 1506, 1507, and 1508. Directions 1506 and 1508 are at 45 degree angle from direction 1507. The directions 1509 and 1510, perpendicular to line 1501, are not recommended since they would change the amount of correction received by the segment.

Figure 16:
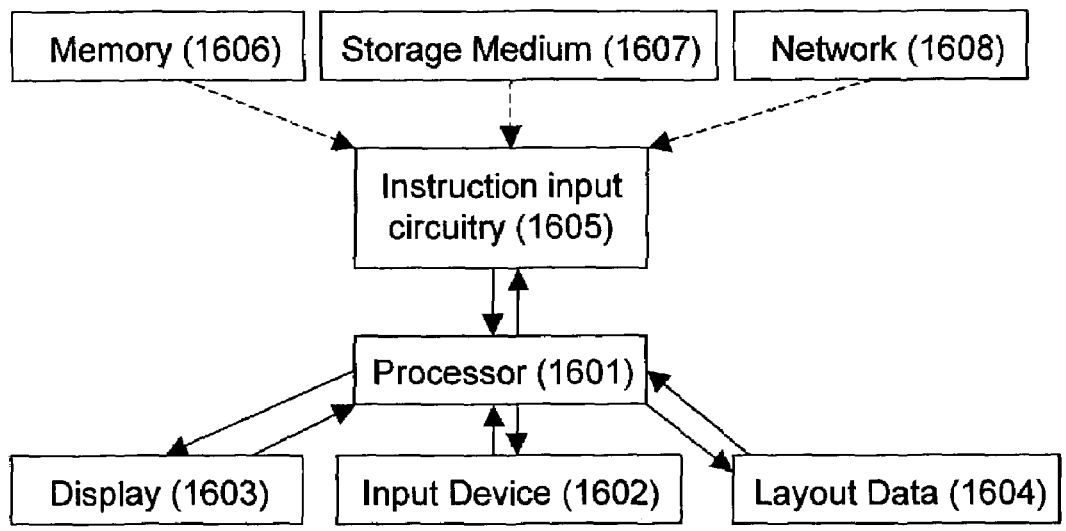
FIG. 16 illustrates a computer system for correcting proximity effects on data layouts.

FIG. 16 illustrates a computer system for correcting proximity effects on data layouts, representing a wide variety of computer systems and computer architectures suitable for this application. A processor 1601 is connected to receive data indicating user signals from user input circuitry 1602 and to provide data defining images to display 1603. Processor 1601 is also connected for accessing mask layout data 1604, which define a mask layout under construction and a layout for a layer of material to be exposed using the mask. Processor 1601 is also connected for receiving instruction data from instruction input circuitry 1605, which can provide instructions received from connections to memory 1606, storage medium access device 1607, or network 1608.

Figure 17:
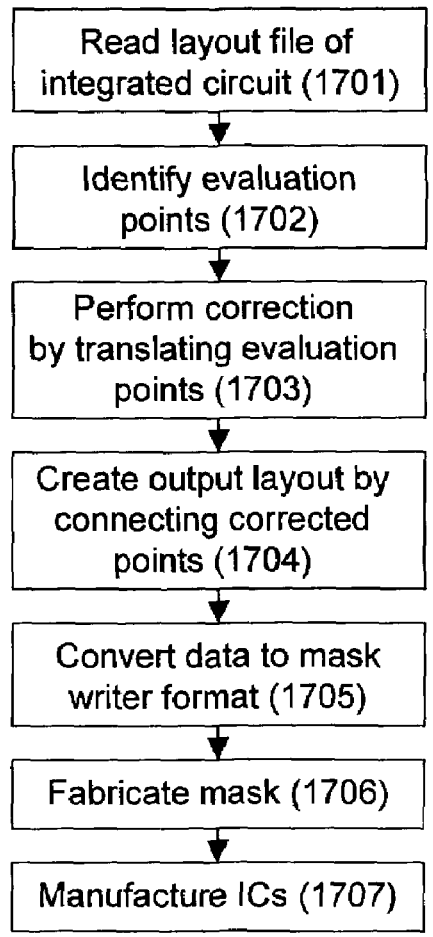
FIG. 17 describes the process flow used to manufacture ICs with improved dimensional control using masks made with the improved proximity effect correction methodology.

FIG. 17 illustrates the manufacturing process of an IC (Integrated Circuit). At step 1701, the layout file of the integrated circuit is first read using a computer system described in FIG. 16. At step 1702, the evaluation points are identified and the correction points are created by translating the evaluation points at step 1703. At step 1704, the adjacent correction points are connected to create the output layout which is subsequently converted to the mask writer format at step 1705. The data resulting from step 1705 is used to create a mask at step 1706, and the mask is finally used in the fabrication process of an IC at step 1707.

CONCLUSION

The data structures and code described in this description can be stored on a computer readable storage medium, which may be any device or medium that can store code and/or data for use by a computer system. This includes, but is not limited to, magnetic and optical storage devices such as disk drives, magnetic tapes, CD (compact discs) and DVD (digital video disks), and computer instruction signals embodied in a transmission medium. For example, the transmission medium may include a communication network, such as the Internet.

The invention can be applied to any type of lithographic process, including optical lithography, extreme ultraviolet lithography, electron beam lithography, ion-beam lithography, and X-ray lithography.

The invention can be applied to any binary masks, rim phase-shifting masks, chromeless phase-shifting masks, attenuated phase-shifting masks, alternating aperture phase-shifting masks used in single or multiple exposure methodologies.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for performing proximity effect correction on a layout of an integrated circuit to produce a corrected layout, the method comprising:

receiving a computer readable layout of a portion of the integrated circuit;

identifying using a data processor a first evaluation point and a second evaluation point of the layout;

performing using a data processor a proximity effect correction of the first evaluation point to form a first corrected point and performing a proximity effect correction of the second evaluation point to form a second corrected point; and computing an interconnecting curve connecting said first corrected point with said second corrected point, wherein said interconnecting curve is a polynomial function.

2. The method of claim 1, wherein said performing includes translating the first evaluation point to form the first corrected point and translating the second evaluation point to form the second corrected point.

3. The method of claim 1, wherein said performing includes translating the first evaluation point along a line perpendicular to the layout to form the first corrected point and translating the second evaluation point along a line perpendicular to the layout to form the second corrected point.

4. The method of claim 1 including fracturing said interconnecting curve into a set of lines arranged on a limited set of angles.

5. The method of claim 1, wherein said first evaluation point and said second evaluation point are placed on a sub-resolution assist feature.

6. The method of claim 5, wherein said performing includes adjusting said first evaluation point and said second evaluation point to enhance contrast on an aerial image of a pattern to be assisted by said sub-resolution assist feature.

7. A mask for defining a layer of material, said mask comprising:

a mask substrate;

a layout pattern on said mask substrate comprising material or physical shapes for transfer of an image to a workpiece;

said layout pattern having a feature including a proximity effect correction of an input segment in a layout file having a first evaluation point and a second evaluation point; the correction comprising a first corrected point, a second corrected point and an interconnecting curve connecting said first corrected point with said second corrected point, whereby points between said first and second evaluation points are corrected by said interconnecting curve.

8. A method for manufacturing integrated circuits, said integrated circuits including at least a layer of materials, comprising:

receiving a computer readable layout of a portion of the integrated circuit;

identifying using a data processor a first evaluation point and a second evaluation point of the layout;

performing using a data processor a proximity effect correction of the first evaluation point to form a first corrected point and performing a proximity effect correction of the second evaluation point to form a second corrected point;

computing an interconnecting curve connecting said first corrected point with said second corrected point to produce a corrected layout segment;

producing a mask having a mask layout based on the corrected layout segment;

treating a semiconductor with material sensitive to radiation energy; and exposing the treated semiconductor to radiation energy using the mask layout.

9. A method for producing a mask for a layout of a layer on an integrated circuit, comprising:

receiving a computer readable layout of a portion of the integrated circuit;

identifying using a data processor a first evaluation point and a second evaluation point of the layout;

performing using a data processor a proximity effect correction of the first evaluation point to form a first corrected point and performing a proximity effect correction of the second evaluation point to form a second corrected point;

computing an interconnecting curve connecting said first corrected point with said second corrected point to produce a corrected layout segment; and producing a mask having a mask layout based on the corrected layout segment.

10. A system for producing layout data, comprising:

a data processor which executes programs of instruction; and memory accessible by the data processor and storing programs of instruction, the programs of instruction including logic to receive a computer readable layout of a portion of the integrated circuit, identify a first evaluation point and a second evaluation point of the layout, perform a proximity effect correction of the first evaluation point to form a first corrected point and perform a proximity effect correction of the second evaluation point to form a second corrected point, and compute an interconnecting curve connecting said first corrected point with said second corrected point to produce a corrected layout segment.

11. An article of manufacture, comprising a machine readable data storage medium storing programs of instruction, including logic to receive a computer readable layout of a portion of the integrated circuit, identify a first evaluation point and a second evaluation point of the layout, perform a proximity effect correction of the first evaluation point to form a first corrected point and perform a proximity effect correction of the second evaluation point to form a second corrected point, and compute an interconnecting curve connecting said first corrected point with said second corrected point to produce a corrected layout segment.

12. A method for performing proximity effect correction on a layout of an integrated circuit to produce a corrected layout, the method comprising:
    receiving a computer readable layout of a portion of the integrated circuit;
    identifying using a data processor a first evaluation point and a second evaluation point of the layout, wherein said first evaluation point and said second evaluation point are placed on a sub-resolution assist feature;
    performing using a data processor a proximity effect correction of the first evaluation point to form a first corrected point and performing a proximity effect correction of the second evaluation point to form a second corrected point; and
    computing an interconnecting curve connecting said first corrected point with said second corrected point.

13. The method of claim 12, wherein said performing includes translating the first evaluation point to form the first corrected point and translating the second evaluation point to form the second corrected point.

14. The method of claim 12, wherein said performing includes translating the first evaluation point along a line perpendicular to the layout to form the first corrected point and translating the second evaluation point along a line perpendicular to the layout to form the second corrected point.

15. The method of claim 12, wherein said interconnecting curve is a straight line.

16. The method of claim 12, wherein said interconnecting curve is a polynomial function.

17. The method of claim 12 including fracturing said interconnecting curve into a set of lines arranged on a limited set of angles.

18. The method of claim 12, wherein said performing includes adjusting said first evaluation point and said second evaluation point to enhance contrast on an aerial image of a pattern to be assisted by said sub-resolution assist feature.

19. A method for performing proximity effect correction on a layout of an integrated circuit to produce a corrected layout, the method comprising:
    receiving a computer readable layout of a portion of the integrated circuit;
    identifying using a data processor a first evaluation point and a second evaluation point of the layout;
    performing using a data processor a proximity effect correction of the first evaluation point to form a first corrected point and performing a proximity effect correction of the second evaluation point to form a second corrected point; and
    computing an interconnecting curve connecting said first corrected point with said second corrected point to form corrected points between said first and second evaluation points.

20. The method of claim 19, wherein said first and second evaluation points are selected in critical locations of the layout, thereby ensuring that the correction is accurately applied to the most critical locations of the layout.

21. The method of claim 19, wherein said performing includes translating the first evaluation point along a line perpendicular to the layout to form the first corrected point and translating the second evaluation point along a line perpendicular to the layout to form the second corrected point.

22. The method of claim 19, wherein said interconnecting curve is a straight line.

23. The method of claim 19, wherein said interconnecting curve is a polynomial function.

24. The method of claim 19 including fracturing said interconnecting curve into a set of lines arranged on a limited set of angles.

25. The method of claim 19, wherein said first evaluation point and said second evaluation point are placed on a sub-resolution assist feature.

26. The method of claim 19, wherein said performing includes adjusting said first evaluation point and said second evaluation point to enhance contrast on an aerial image of a pattern to be assisted by said sub-resolution assist feature.

27. The method of claim 20, wherein said first and second correction points are generated using a rule-based methodology.

28. The method of claim 20, wherein the first and second correction points are generated using a model-based methodology.

* * * * *